United States Patent [19]
Izumi et al.

[11] Patent Number: 6,130,885
[45] Date of Patent: *Oct. 10, 2000

[54] FREQUENCY HOPPING WIRELESS COMMUNICATION SYSTEM CAPABLE OF SIMULTANEOUSLY COMMUNICATING DIFFERENT DATA AND FREQUENCY HOPPING WIRELESS COMMUNICATION APPARATUS

[75] Inventors: Michihiro Izumi, Yokohama; Tadashi Arakawa, Machida; Yasunori Suzuki, Inagi, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/617,091

[22] Filed: Mar. 18, 1996

[30] Foreign Application Priority Data

| Mar. 20, 1995 | [JP] | Japan | ................................. 7-087634 |
| Mar. 20, 1995 | [JP] | Japan | ................................. 7-087635 |
| Mar. 20, 1995 | [JP] | Japan | ................................. 7-087636 |

[51] Int. Cl.[7] ...................................................... H04J 1/00
[52] U.S. Cl. ........................... 370/343; 370/493; 375/132
[58] Field of Search .................................... 370/493–495, 370/319, 321, 329, 330, 343–345, 347, 349, 436, 468, 470, 471, 478, 480; 375/202, 132–137

[56] References Cited

U.S. PATENT DOCUMENTS

| 4,870,642 | 9/1989 | Nohara et al. ............................ 370/75 |
| 5,249,174 | 9/1993 | Itoh ......................................... 370/202 |
| 5,428,819 | 6/1995 | Wang et al. .............................. 455/62 |
| 5,483,531 | 1/1996 | Jouin et al. ............................. 370/493 |
| 5,586,120 | 12/1996 | Cadd ...................................... 370/468 |
| 5,638,399 | 6/1997 | Schuchman et al. .................... 370/324 |

OTHER PUBLICATIONS

G.B. Bleazard, "Introducing Satellite Communications", The National Computing Centre Limited, pp. 232–233, 1985.

Jerry M. Rosenberg, "Dictionary of Computers, Data Processing, and Telecommunications", John Wiley & Sons, Inc., pp. 337 and 581, 1984.

A. Mehrotra, "Cellular Radio: Analog and Digital Systems", Artech House, Inc., pp. 297–298, 1994.

D.L. Schilling, "Wireless Communications Going Into the 21st Century", IEEE Transactions on Vehicular Technology, vol. 43, Iss. 3, pt.2, pp. 645–652, Aug. 1994.

D.G. Streer, "Wireless Operation in the Unlicensed PCS Band", 1994 Third Annual International Conference on Universal Personal Communications, (Cat. No. 94Th0622–1), pp. 586–590, Oct. 1994.

*Primary Examiner*—Melvin Marcelo
*Attorney, Agent, or Firm*—Fitzpatrick, Cella, Harper & Scinto

[57] ABSTRACT

In a wireless communication apparatus for communicating by using a frequency hopping system, by providing a function such that frequency channels are divided into a plurality of channel groups or data of different types is transmitted every divided channel group or a different channel access system is used every channel group, even if the data of different types is simultaneously transmitted, a data error due to a collision or mutual interference of the data is prevented.

50 Claims, 14 Drawing Sheets

| FIG. 10A |
| FIG. 10B |

FREQUENCY HOPPING WIRELESS COMMUNICATION SYSTEM CAPABLE OF SIMULTANEOUSLY COMMUNICATING DIFFERENT DATA AND FREQUENCY HOPPING WIRELESS COMMUNICATION APPARATUS

BACKGROUND OF THE INVENTION

1. Field of the Invention

The present invention relates to a frequency hopping wireless communication system and a frequency hopping wireless communication apparatus which can simultaneously communicate different data such as data like a voice that is communicated by a communication frame of a fixed length, data like a packet that is communicated by a communication frame of a variable length, and the like.

2. Related Background Art

Hitherto, there is a wireless communication apparatus using a frequency hopping system because of a reason such that it is hardly influenced by a fading, an interfering wave, or the like due to a multiple-path.

According to the frequency hopping system, a communication is performed while switching a frequency in a certain frequency band every communication frame. There are the following two methods: a method whereby for an apparatus having a predetermined transmission speed as in a public line, a communication is executed by using a communication frame of a fixed length according to the transmission speed; and a method whereby a length of communication frame is varied in accordance with an amount of data to be transmitted as in a packet communication.

In the case where a terminal which can perform a communication through a public line and a terminal which can perform a packet communication between the terminals without intervening the public line exist in one system, the case where one terminal has both of a function for performing a communication through the public line and a function for performing a packet communication, or the like, there is a situation such that both of a communication frame of a fixed length and a communication frame of a variable length are simultaneously used.

However, when the communication frame of a fixed length and the communication frame of a variable length or communication frames of a plurality of variable lengths are simultaneously used, since the lengths of the communication frames are different, the communications cannot be synchronized, so that a data error occurs due to a collision of data or a mutual interference.

When the data error occurs, data having a non-real-time performance like packet data can be again transmitted. However, when a data error frequently occurs, a transmission speed remarkably deteriorates and in case of data such as a voice or the like having a strong real-time performance, it is difficult to perform an error control due to the retransmission, so that such data becomes noises. Therefore, the communication by the frequency hopping system using the communication frame of the fixed length and the communication by the frequency hopping system using the communication frame of the variable length cannot be simultaneously executed by the same system or same terminal.

SUMMARY OF THE INVENTION

It is an object of the invention to provide a frequency hopping wireless communication system and a frequency hopping wireless communication apparatus which can simultaneously communicate different data.

Another object of the invention is to divide one frequency band into a plurality of channel groups and to transmit different data every divided channel group.

Still another object of the invention is to simultaneously communicate data of a fixed length and data of a variable length by using the frequency hopping system.

Further another object of the invention is to simultaneously communicate data having a real-time performance and data having a non-real-time performance by using the frequency hopping system.

Further another object of the invention is to simultaneously communicate voice data and packet data by using the frequency hopping system.

The above and other objects and features of the present invention will become apparent from the following detailed description and the appended claims with reference to the accompanying drawings.

DETAILED DESCRIPTION OF THE PREFERRED EMBODIMENTS

Figure 1:
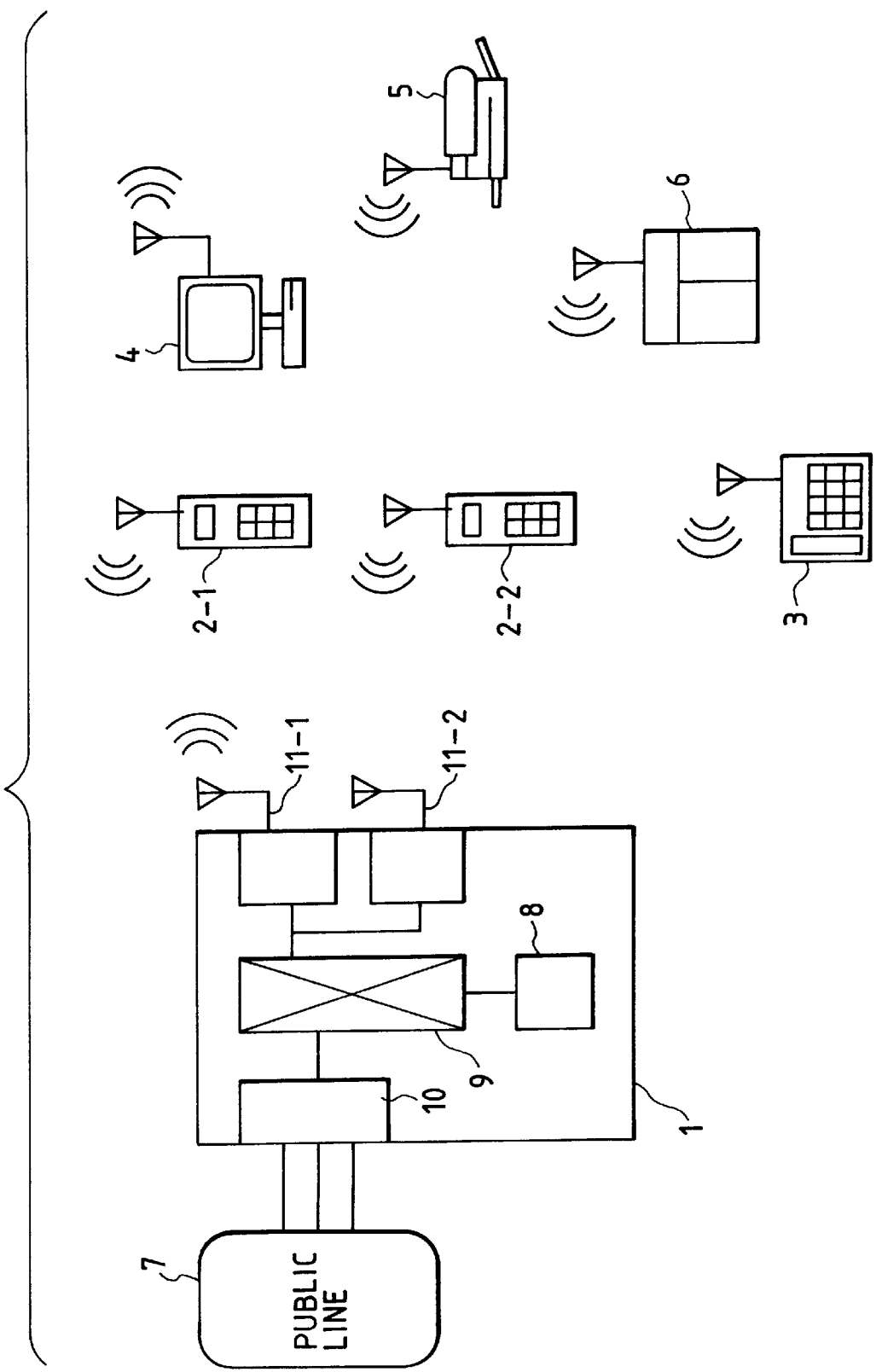
FIG. 1 is a block diagram showing an example of a construction of a wireless communication system according to the first embodiment of the invention.

FIG. 1 is a block diagram showing an example of a construction of a wireless communication system according to an embodiment of the invention.

The system of the embodiment has: a main apparatus 1 which has an exchanging function and is connected to a public line 7; telephones 2-1 and 2-2 which are enclosed in the main apparatus 1; a facsimile 3 serving as a data terminal; a personal computer (hereinafter, abbreviated to a PC) 4; a printer 5; and a copying apparatus 6.

It is now assumed that a terminal which can also handle data other than a voice, namely, a facsimile, a printer, a copying apparatus, or the like as well as a personal computer is called a data terminal.

The main apparatus 1 has: a CPU 8 for performing a whole control of the main apparatus; a time switch 9 for exchanging a communication path; a public line interface 10 for enclosing the public line 7; and wireless connection apparatuses 11-1 and 11-2 for enclosing the foregoing telephones or the like.

Figure 2:
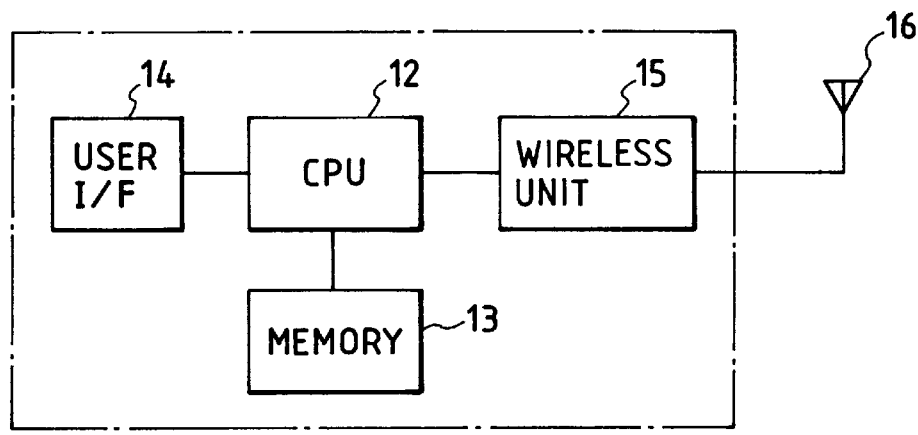
FIG. 2 is a block diagram showing a fundamental construction of each terminal in the first embodiment.

FIG. 2 is a block diagram showing a fundamental construction of each terminal in the embodiment.

As shown in the diagram, the terminal has: a CPU 12 for performing a whole control of the terminal; a memory 13 for storing various data; a user interface unit 14 such as a key input unit or the like; a wireless interface unit 15 for performing a wireless communication; and an antenna 16.

Figure 3:
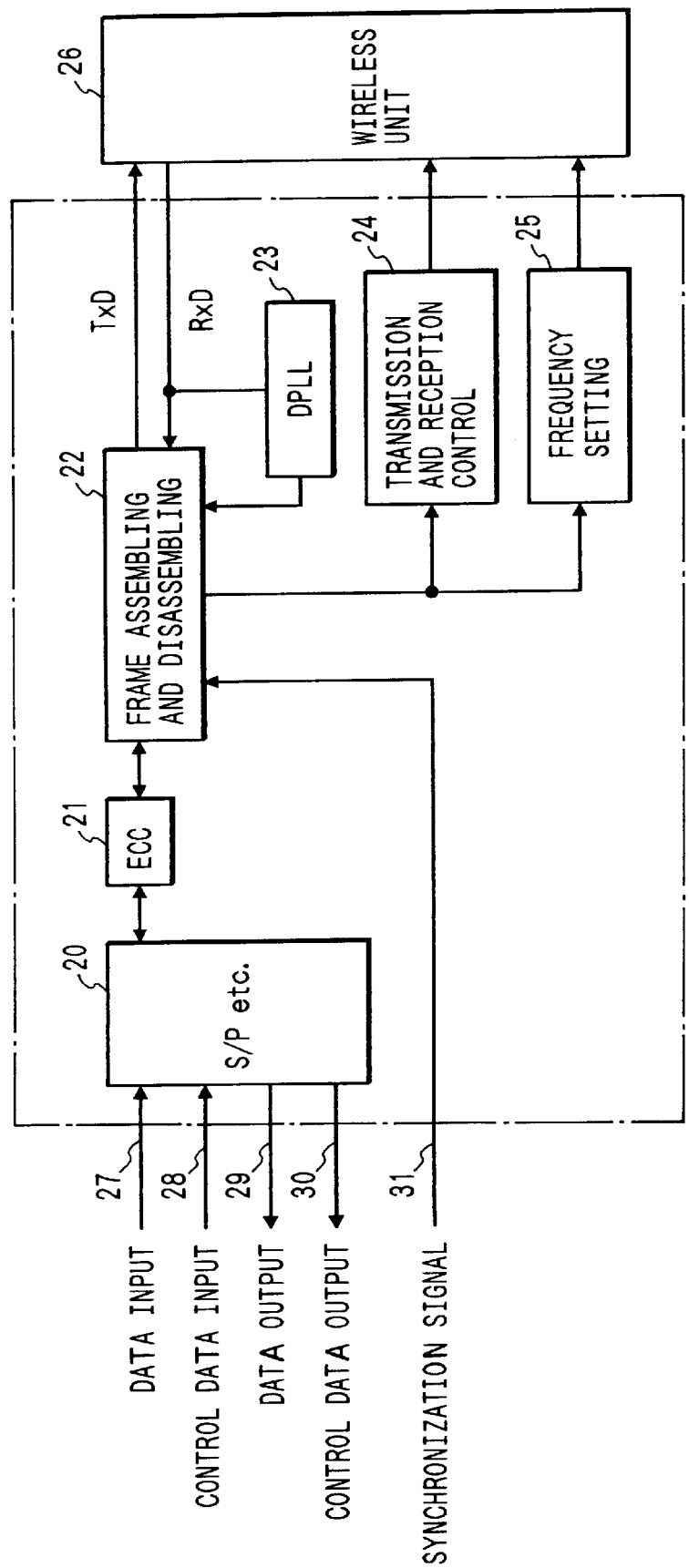
FIG. 3 is a block diagram showing a construction of a wireless interface unit which is provided for each terminal of the first embodiment.

FIG. 3 is a block diagram showing a construction of a wireless interface unit which is provided for each terminal of the embodiment.

As shown in the diagram, the wireless interface unit has: a converting unit 20 for executing a serial/parallel conversion for converting a data input 27, a control data input 28, a data output 29, and a control data output 30 which are serially transmitted into parallel data, a conversion opposite to the serial/parallel conversion, or the like; an ECC (Error Correction Code) 21 for performing an error correcting process; a frame assembling and disassembling unit 22 for assembling or disassembling a format on the basis of a synchronization signal (hereinafter, simply referred to as a sync signal) 31; a DPLL (Delay Phase-Locked Loop) 23 for performing a bit synchronization; a transmission and reception control unit 24 for controlling transmitting and receiving operations; a frequency setting unit 25 for setting a transmitting frequency; and a wireless unit 26 including a modulating and demodulating unit.

Figure 4:
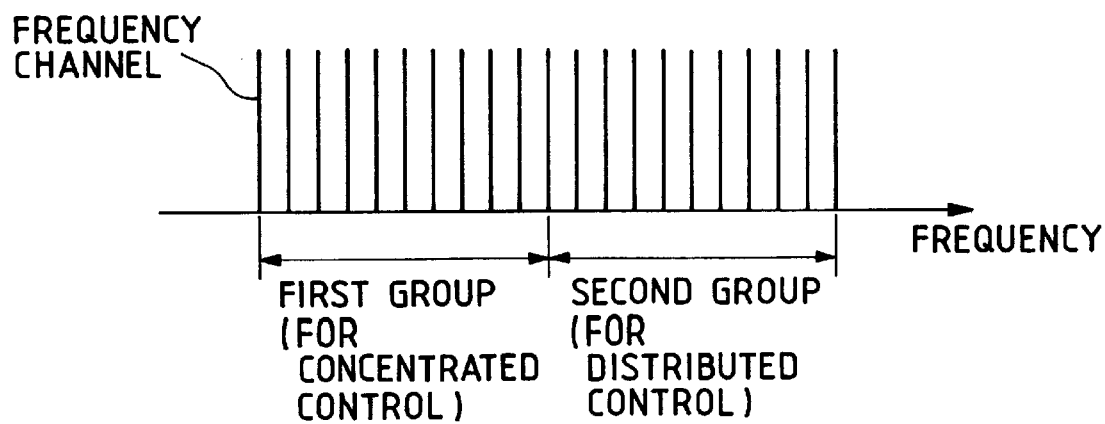
FIG. 4 is an explanatory diagram showing an example of division of a frequency channel in the first embodiment.

FIG. 4 is an explanatory diagram showing an example of division of a frequency channel in the embodiment.

In the system, a frequency channel which is used is divided into two channel groups. In the first channel group, a voice communication of a concentrated control system through the main apparatus is executed. In the second channel group, a data communication of a distributed control system (namely, peer-to-peer) for directly performing a communication between the terminals without intervening a central control unit such as a main apparatus or the like is executed.

A channel only for control to transmit and receive control data between the terminal and the main apparatus is provided for each of the first and second channel groups. In the case where the terminal starts a voice communication through the main apparatus, information to start the communication is transmitted and received between the main apparatus and the terminal by the control channel of the first channel group. In the case where the terminal starts the data communication in a peer-to-peer manner, a fact that the transmission is executed is notified to a transmitted side terminal by the control channel of the second channel group.

Figure 5:
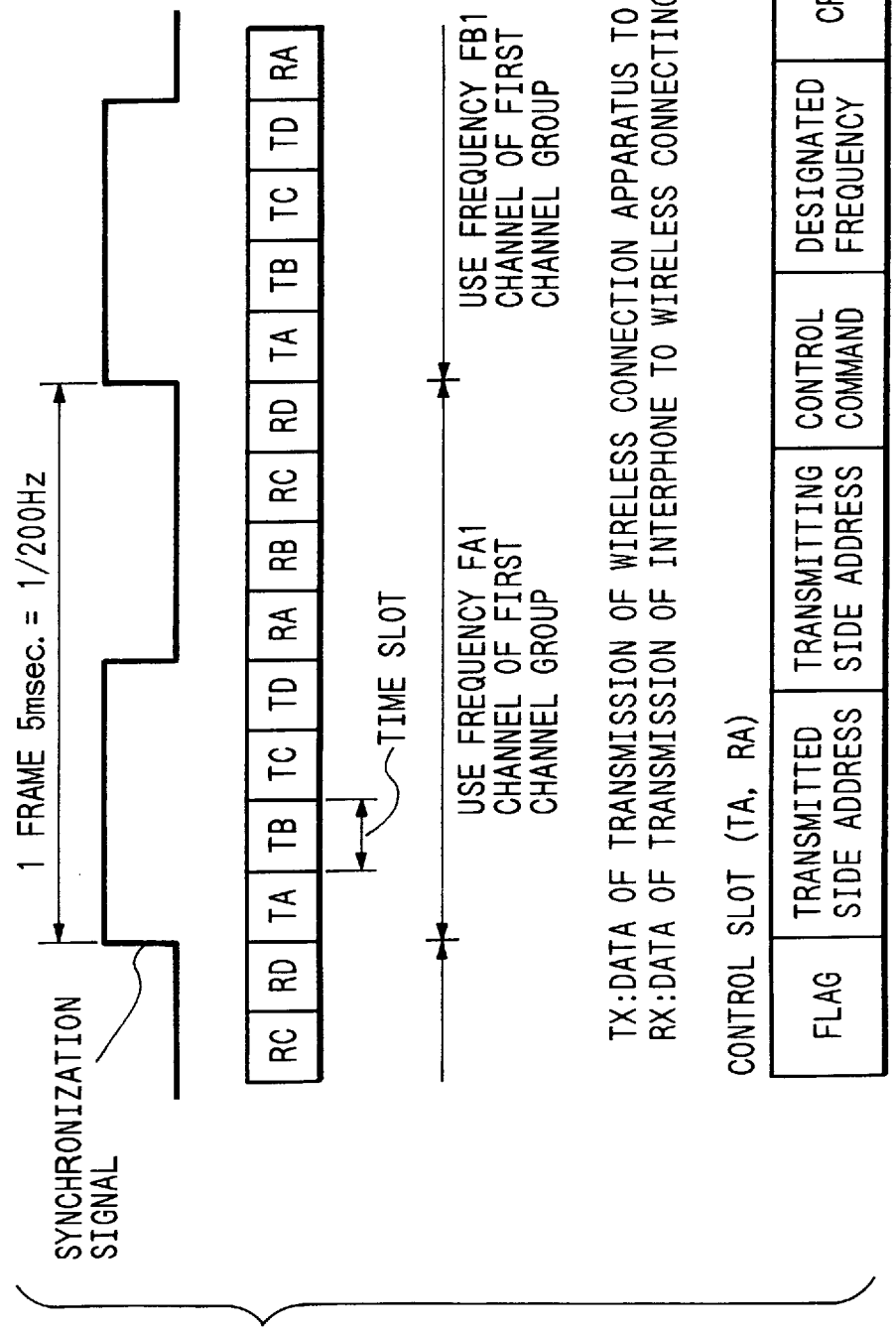
FIG. 5 is an explanatory diagram showing a format of a time-division multiplex communication which is executed between a main apparatus and an interphone (the first channel group) in the first embodiment.
Figure 6:
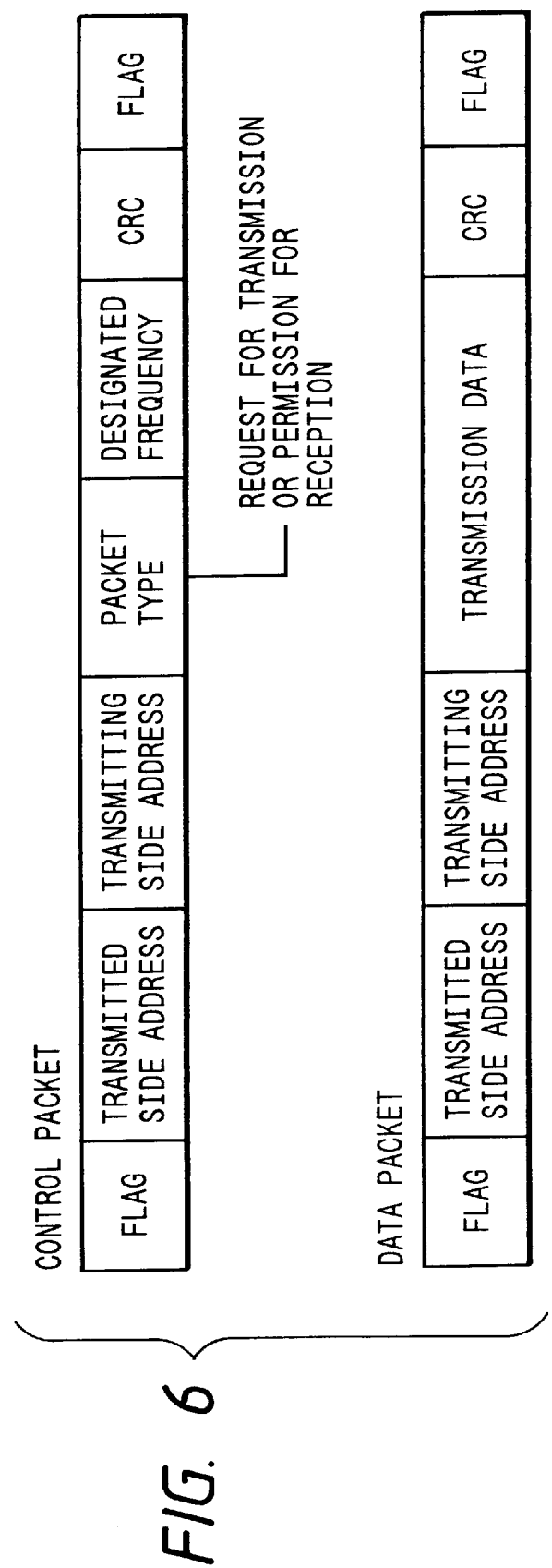
FIG. 6 is an explanatory diagram showing a packet format of a communication which is executed in a second channel group in the first embodiment.

FIG. 5 is an explanatory diagram showing a format of a time-division multiplex communication which is executed between the main apparatus and an interphone (first channel group). FIG. 6 is an explanatory diagram showing a packet format of a communication which is performed in the second channel group.

In FIG. 5, TX (TA, TB, TC, TD) denotes data which is transmitted from the main apparatus to the interphone. RX (RA, RB, RC, RD) indicates data which is transmitted from the interphone to the main apparatus. TX and RX denote transmitting speeds such that the data can be transmitted by the public line and indicate time slots of predetermined durations.

TA and RA are allocated as slots for control and comprise: a flag including a preamble for supplementing a bit synchronization; addresses on the transmitted side and transmitting side; a control command such as originating call request, incoming call notification, dial information, or the like; a designated frequency to designate a frequency which is used at a next channel; a CRC for error correction; and the like. TB, TC, TD, RB, RC, and RD denote time slots each for storing a voice.

In FIG. 6, a control packet is a packet for control and comprises: a flag including a preamble for supplementing a bit synchronization; addresses on the transmitted side and transmitting side; a packet type indicative of a transmission request and a permission for reception; a designated frequency to designate a frequency which is used in a next packet; a CRC for error correction; and the like.

As for the data packet, the packet starts from the flag including the preamble to supplement the bit synchronization and data is transmitted subsequent to the transmitted side address and the transmitting side address. A length and a transmitting interval of the data packet also change depending on transmission data.

In the embodiment, frames in FIGS. 5 and 6 mentioned above are switched to the frequency designated by the designated frequency and a wireless communication is executed, thereby performing a frequency hopping.

Figure 7:
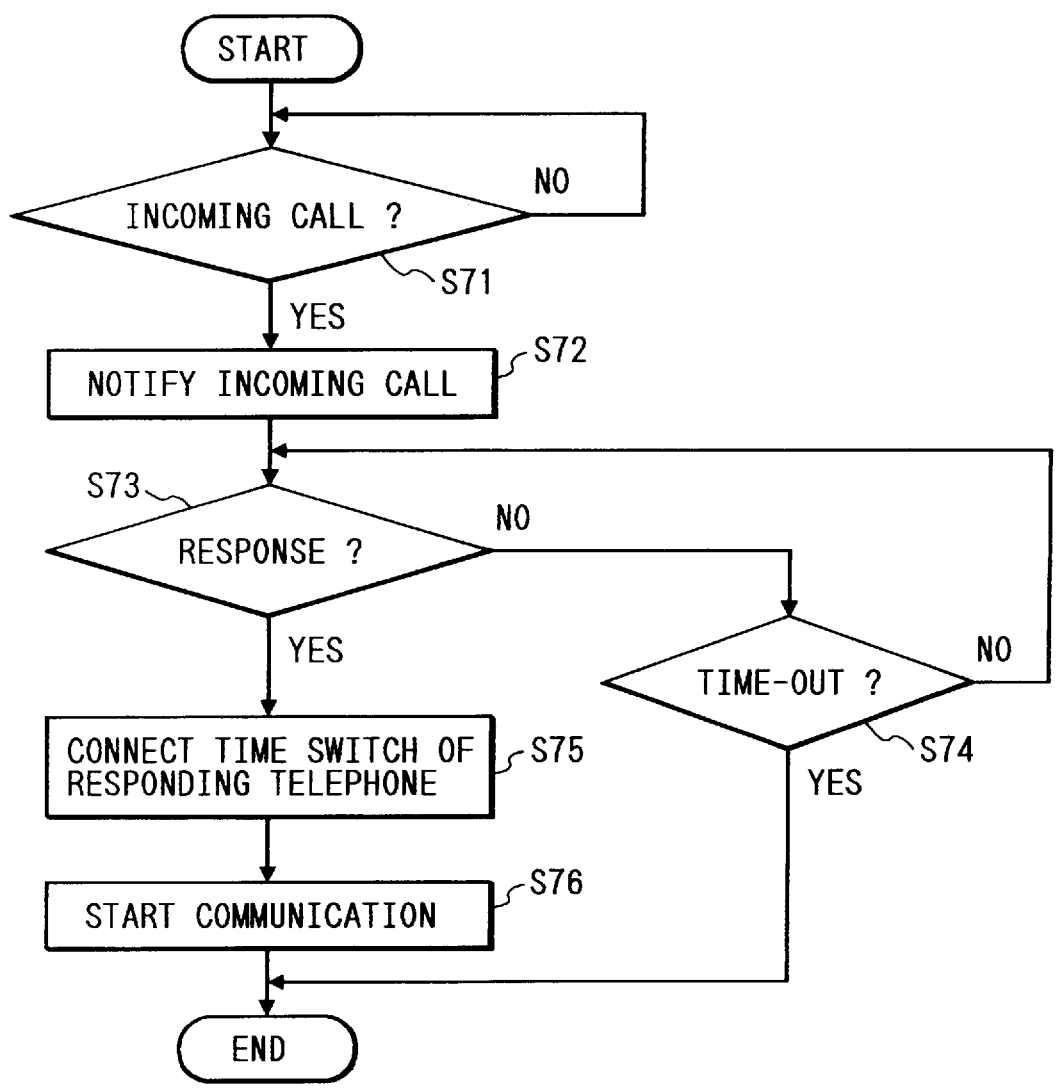
FIG. 7 is a flowchart showing a procedure in the case where a communication for an incoming call from a public line is executed by a first channel group in the first embodiment.

FIG. 7 is a flowchart showing a procedure in the case where there is an incoming call to an interphone from the public line in the first channel group.

In FIG. 7, when there is an incoming call to the telephone enclosed in the extension from the public line (S71), the main apparatus has been designated to a ringing mode and notifies the incoming call by the first channel group to all of the terminals using the channel of the first channel group (S72). In accordance with it, when there is a response before the timeout (S74) in one telephone in each terminal (S73), a time switch (communication path) is connected to the wireless connection apparatus corresponding to the telephone (S75). The voice data received from the public line is sent to the relevant telephone by the first channel group, thereby starting the communication (S76).

A communication format between the wireless connection apparatus and the interphone becomes as shown in FIG. 5 and a format is formed in the frame assembling and disassembling unit 22 in the wireless interface.

When the interphone receives the data transmitted from the wireless connection apparatus, the interphone transmits the data toward the wireless connection apparatus at a predetermined timing. The transmission path has been time-divisionally multiplexed. In FIG. 5, four channels including a control channel have been multiplexed. Thus, one wireless connection apparatus can simultaneously communicate with up to three telephones. One period for transmission or reception is called a "frame" here.

In the transmission between the wireless connection apparatus and the telephone, a frequency which is used is changed every frame in accordance with the designated frequency of the control slot. Namely, by changing the frequency every predetermined time, even if a specific channel is interfered, only a partial time is influenced, so that a communication of a high quality can be realized.

Figure 8:
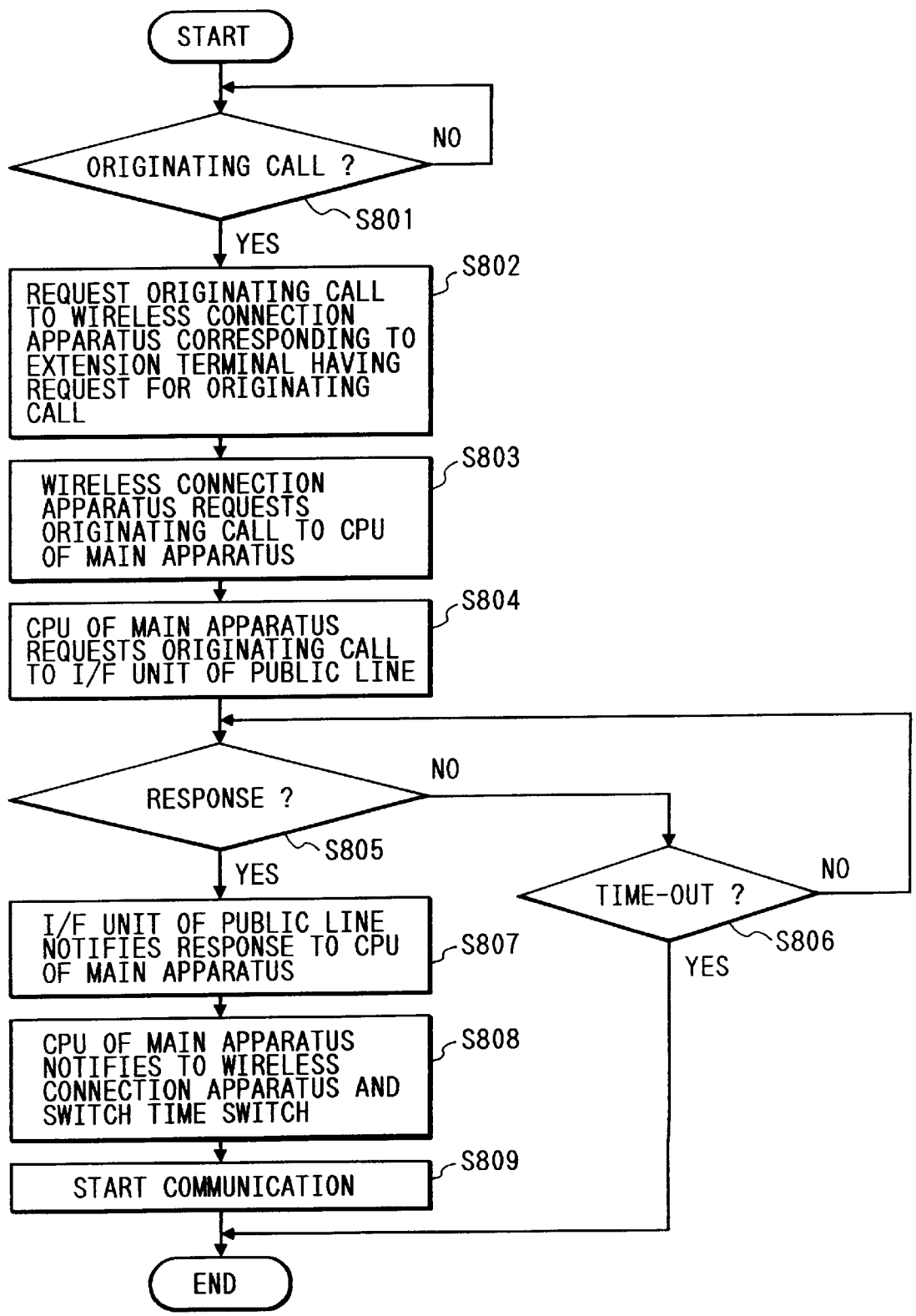
FIG. 8 is a flowchart showing a procedure for performing a transmission to the public line through the main apparatus in the first embodiment.

FIG. 8 is a flowchart showing a procedure when the interphone or data terminal performs a transmission to the public line through the main apparatus in the first channel group.

First, processes in the case where the extension terminal transmits a voice or data to the public line will now be described. It is now assumed that the extension terminals include both of a terminal such as a telephone or the like which doesn't have a peer-to-peer communicating ability and a data terminal having a peer-to-peer communicating ability.

In case of accessing to the public line, the extension terminal starts the communication with the wireless connection apparatus of the main apparatus by using the frequency channel of the first group. A communication format between the wireless connection apparatus and the extension terminal is as shown in FIG. 5. The format is formed in the frame assembling and disassembling unit 22 (FIG. 3) of the wireless interface unit. Since a transmitting ability of 64 kbps is provided for one channel, a voice or low-speed data which was PCM (Pulse Code Modulation) encoded can be transmitted.

Explanation will now be described with reference to a flowchart of FIG. 8. In FIG. 8, when a request to transmit data to the public line occurs (S801), the extension terminal sends a transmission request to the wireless connection apparatus by using the control channel (RA) of the first channel group provided between the extension terminal and the wireless connection apparatus of the main apparatus (S802). The wireless connection apparatus which received the transmission request notifies the CPU 8 of the main apparatus 1 of a fact that there is the transmission request to the public line (S803). After that, the CPU 8 notifies the transmission request to the public line interface 10 (S804). An originating call is performed to a partner terminal through the public line.

When there is a response from the partner terminal (S805), the public line interface 10 notifies the CPU 8 of the main apparatus 1 of a fact that there is a response (S807). The CPU 8 switches the time switch 9 (S808). Thus, the extension terminal can start the transmission of the data to the public line (S809).

The extension communication can be also executed by a procedure that is fundamentally similar to the case of the incoming call from the public line or a transmission. A case of making a telephone call from the interphone 2-1 to the interphone 2-2 by using the first channel group will now be described with reference to FIG. 9.

When there is an originating call from the interphone 2-1 (S901), for example, the wireless connection apparatus 11-1 accepts the originating call request (S902) and notifies the CPU 8 of the main apparatus of a fact that there is an originating call request from the interphone 2-1 to the interphone 2-2 by the first channel group (S903).

The CPU 8 notifies an incoming call to the wireless connection apparatus 11-2 corresponding to the interphone 2-2 (S904). The wireless connection apparatus 11-2 sends a ringing command to the interphone 2-2 by using the first channel group (S905).

When the interphone 2-2 responds (S906) before a timeout (S907), the wireless connection apparatus 11-2 notifies the CPU 8 of a fact that there is a response (S908). The CPU 8 controls a time switch and connects a time slot corresponding to the interphone 2-1 to the interphone 2-2 (S909). The time slot denotes a time region corresponding to one channel in the case where the time-division multiplexing was performed (refer to FIG. 5).

Thus, a state in which a link of the interphones 2-1 and 2-2 is established is derived and a communication is started by using the first channel group (S910).

A communication format between the interphone in speech communication and the wireless connection apparatus is similar to that in case of the incoming call from the public line or transmission which has been described before. Namely, the signals have been time-divisionally multiplexed and the frequency is changed every frame.

The fundamental operation of the second channel group will now be described.

Figures 10, 10A:
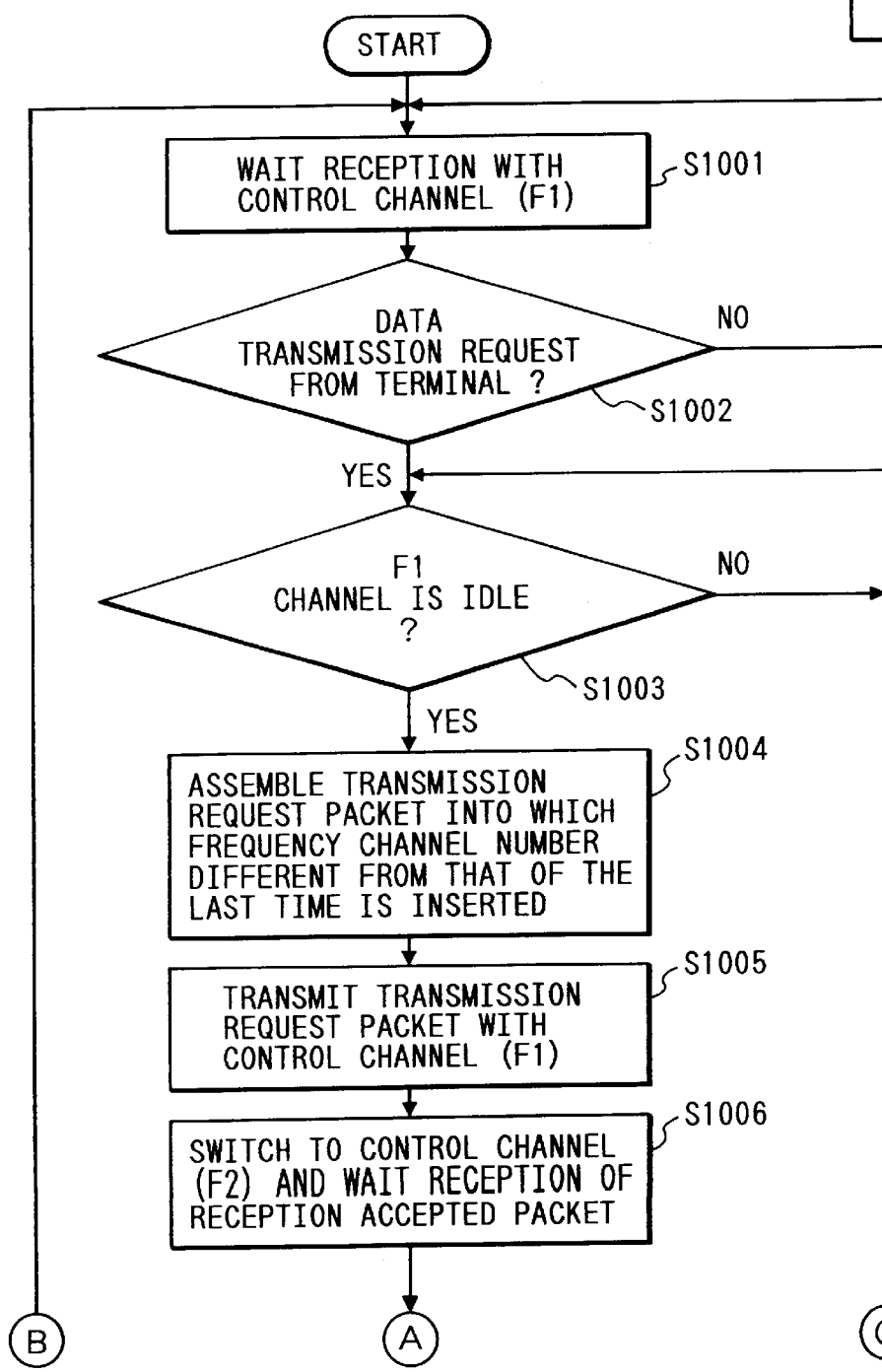
FIG. 10 is comprised of FIGS. 10A and 10B illustrating flowcharts showing a procedure in case of transmitting extension data in a peer-to-peer manner in the first embodiment.
Figure 10B:
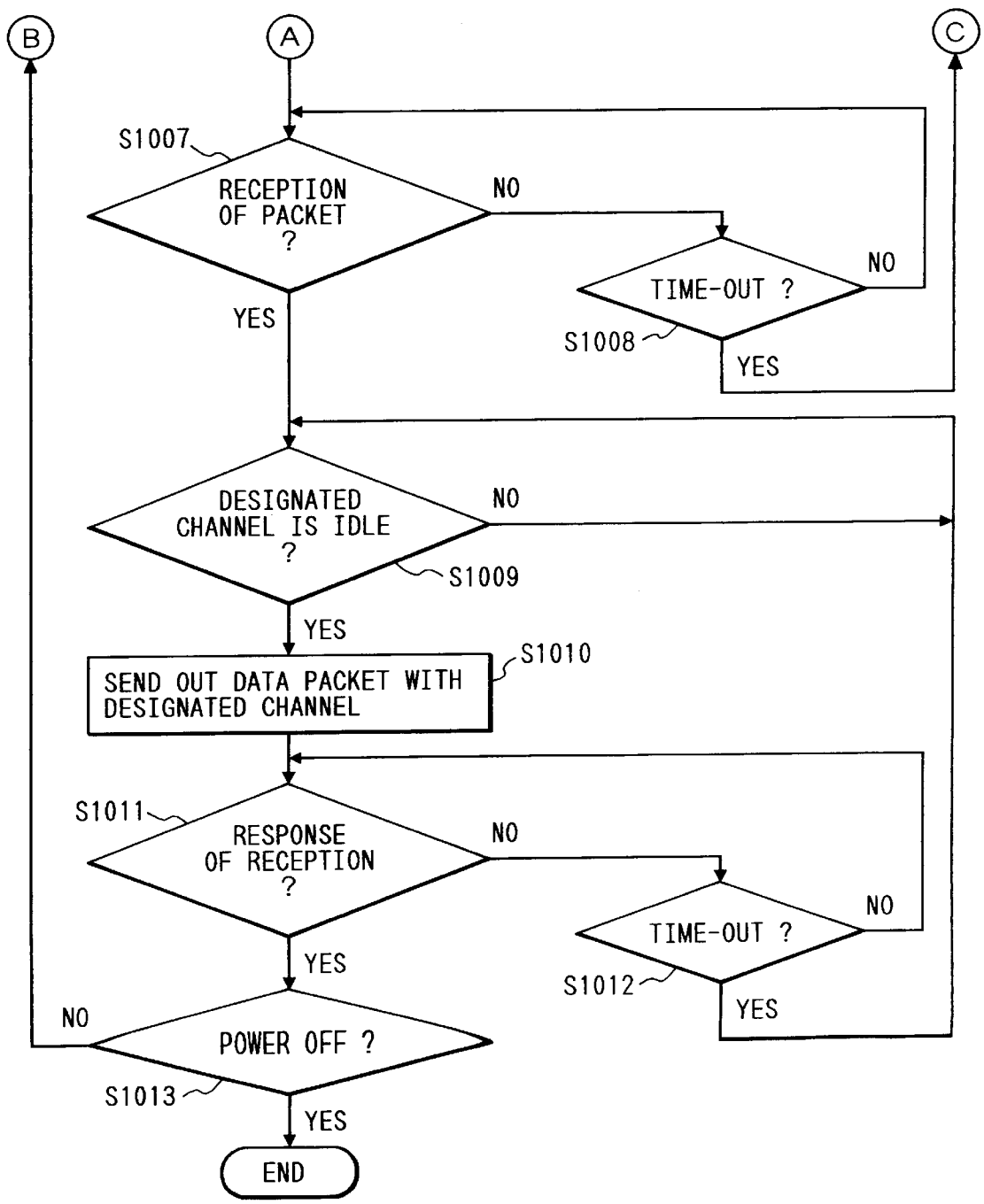
Figure 11:
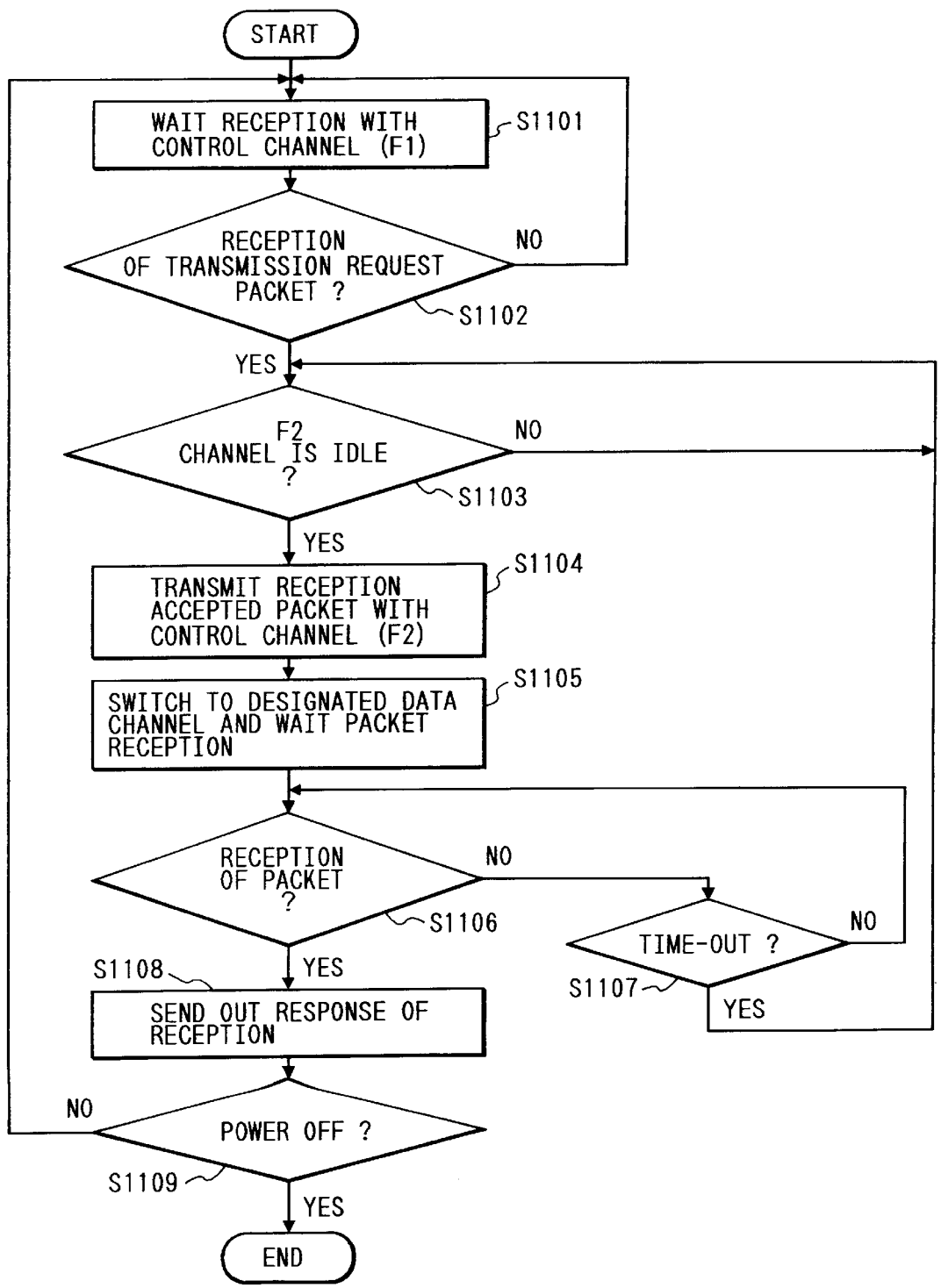
FIG. 11 is a flowchart showing a procedure in case of transmitting the extension data in a peer-to-peer manner in the first embodiment.

In this instance, the data is transmitted in a peer-to-peer manner and the data communication between the personal computer 4 using the channel of the second channel group and the printer 5 or copying apparatus 6 will now be described with reference to FIGS. 10A, 10B and 11.

First, the terminal using the channel of the second channel group waits for the reception at a frequency F1 for the control channel in the second channel group (S1001, S1101). The terminal to which a transmission request was generated (S1002) discriminates whether the frequency F1 for the control channel is idle or not (S1003) in order to transmit a control packet as shown in FIG. 6 by using the control channel. When the control channel (F1) is idle, a control packet for a transmission request is assembled by a frequency number of the second channel group that is used in the next channel, an address (transmitting side address) of the self terminal, a transmitted side address, and the like (S1004). A transmission request packet is transmitted with the control channel (F1) (S1005). The control channel is switched to F2 and a reception accepted packet is set into a reception waiting state (S1006).

Frequency channel number information in the second channel group which is used for data transmission is included in the packet of the transmission request. In the case where the transmission request to the self terminal exists in the packet received in step S1102, the terminal which is waiting with the frequency F1 of the control channel discriminates whether the frequency F2 of the control channel for return is idle or not (S1103) in order to make a response for reception permission for the transmission request. When the control channel (F2) is idle, the control packet indicative of the permission of the reception is transmitted with the control channel (F2) (S1104). The terminal waits with the channel which has already been designated (S1105).

The transmitting side terminal (S1007) which received the reception accepted packet before timeout (S1008) discriminates whether the designated channel is idle or not in order to start the transmission of the data by using the designated channel (S1009). When the designated channel is idle, a data packet of a length according to an amount of data to be transmitted is assembled and is transmitted with the designated channel (S1010). For example, when a transmission data amount is small, a short data packet is assembled and sent. When the transmission data amount is large, a long data packet is assembled and sent.

When the data packet sent from the transmitting side terminal is received (S1106) before timeout (S1107), the reception side terminal transmits a reception response in order to notify the transmitting side terminal of a fact that the data packet was received (S1108).

By receiving the reception response (S1011), the transmitting side terminal recognizes that the reception side terminal could receive the data.

By repeating the transmission and reception of the packet and the reception response between the transmitting side and the reception side by using the second channel group, a data communication is executed.

For example, in the case where the user wants to obtain a print output by transmitting the data of the personal computer 4 to the printer 5 or copying apparatus 6, a communication request is sent from the PC 4 to the printer 5 or copying apparatus 6. When the printer 5 or copying apparatus 6 accepts the incoming call, a packet for permission of the transmission is returned to the PC 4. The data transmission from the PC 4 to the printer 5 or copying apparatus 6 is started with the designated channel.

The packet is constructed by up to about 1500 bytes. In case of transmitting the data more than 1500 bytes, it is divided into a plurality of packets and transmitted. Each time the packet is transmitted, the above procedure is repeated. In this instance, the frequency channel to be used is changed every time, thereby enabling each channel to be equivalently used.

In such a second channel group, since it is not subjected to a control of a transmission capacity of the public line or time switch, in this case, the data is transmitted from the PC 4 to the printer 5 or copying apparatus 6 at a transmitting speed of about hundreds of kbps.

Figure 12:
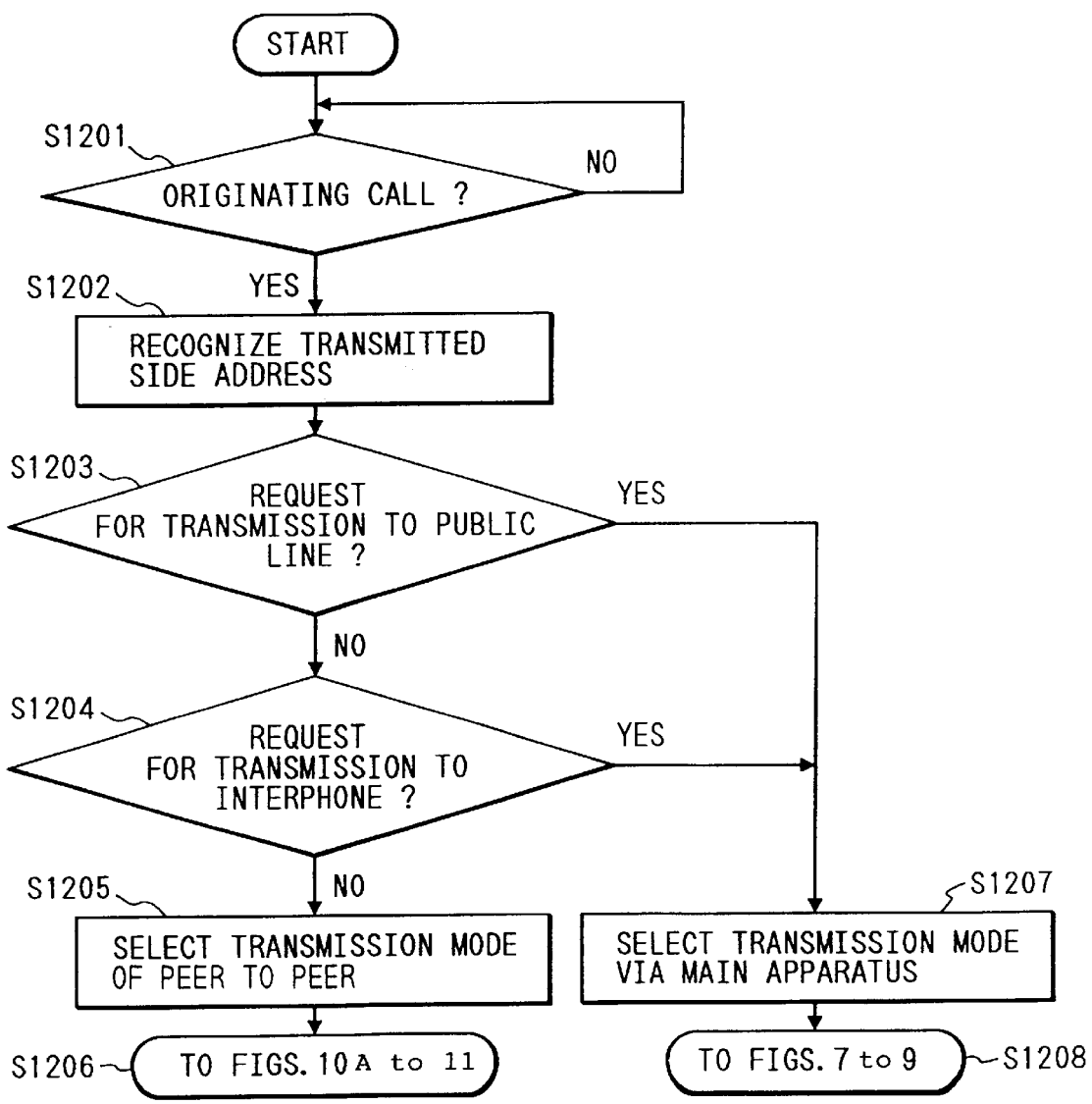
FIG. 12 is a flowchart showing a fundamental procedure in the case where an extension terminal transmits data in the first embodiment.

A transmitting operation in the case where the data terminal can handle both of a voice that is communicated by the first channel group and the data that is communicated by the second channel group will now be described with reference to FIG. 12.

First, when the data transmission request occurs in the data terminal (S1201), the CPU 12 of the data terminal recognizes the address on the transmitted side which was inputted through the user interface unit 14 (S1202). On the basis of the information stored in the memory 13 and the address information which was recognized, checks are made to see if the requested transmission is executed (1) for the public line through the main apparatus, (2) for the telephone in the private branch, or (3) for the terminal other than the telephone in the private branch (S1203, S1204).

Figure 9:
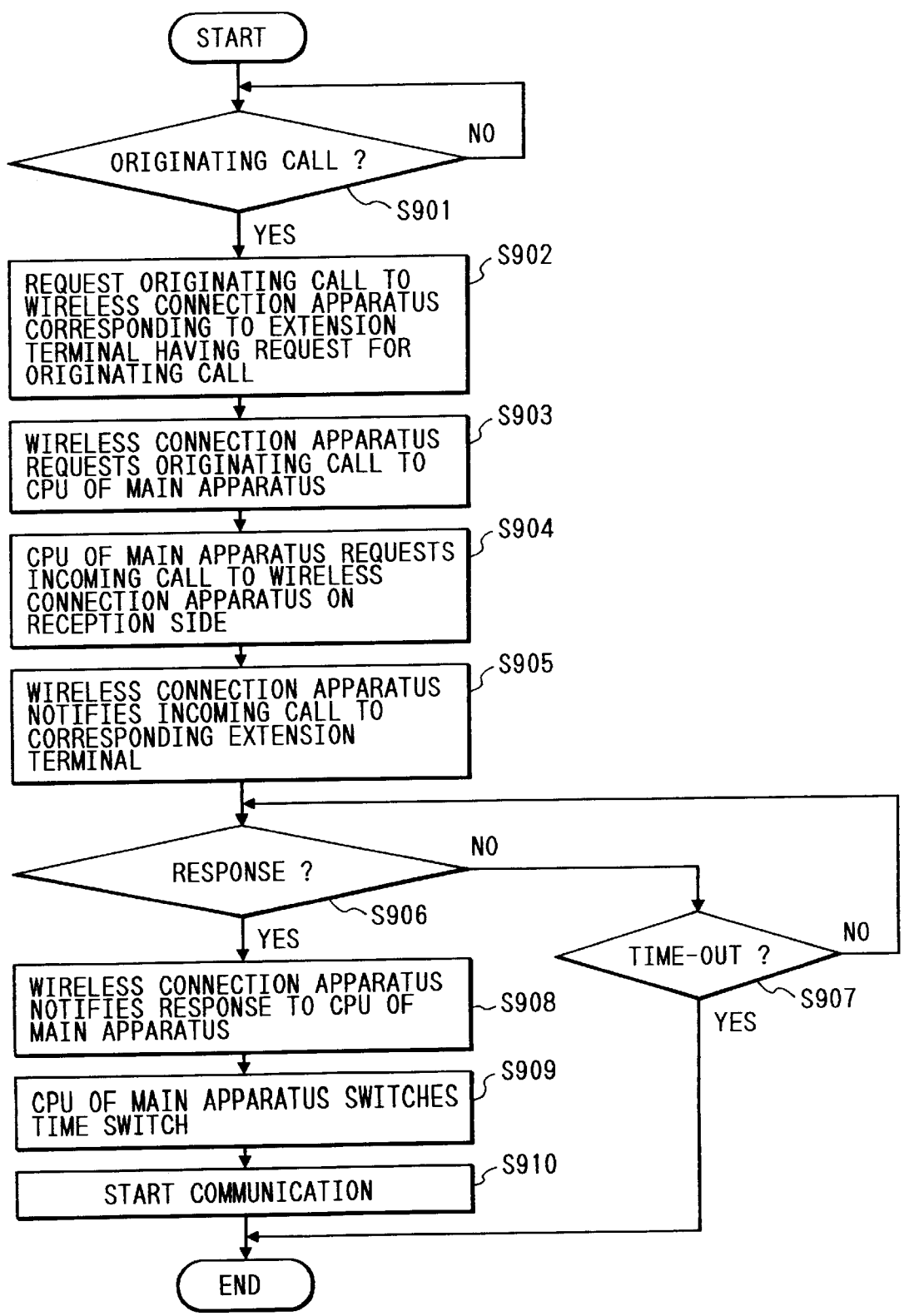
FIG. 9 is a flowchart showing a procedure in case of performing an extension communication between extension terminals in the first channel group in the first embodiment.

In the above cases (1) and (2) as a result of the judgment, the operating mode is shifted to the mode for communicating through the main apparatus 1 (S1207) and the operations described in FIGS. 7, 8, and 9 are executed. In the above case (3), the operating mode is shifted to the mode for communicating in a peer-to-peer manner without intervening the main apparatus (S1205) and the operations described in FIGS. 10A, 10B and 11 are executed.

The operations of the terminal group using the first channel group and the terminal group using the second channel group have been described above. In case of using the first channel group, data such as a voice or the like having a strong real-time performance is transmitted. In case of using the second channel group, a large amount of data as in case of a file transfer is transmitted at a high speed.

As mentioned above, by dividing the frequency to be used in accordance with the data in which the lengths of frames are different due to the type of data to be transmitted or the data amount, the data communication can be performed without becoming aware of a collision or interference of the data. In the embodiment, consequently, the transmission of data such as a voice having a high real-time performance and the data transmission of a high speed like a packet communication can be simultaneously performed by the same system without causing a collision or interference of data.

The second embodiment of the invention will now be described.

The first embodiment has been described above on the assumption that the number of channels of each channel group is fixed. However, in the case where a frequency at which the transmission request occurs is deviated for either one of the voice system and the other data, so long as the number of channels allocated to the group is not proper, a whole frequency using efficiency deteriorates. There is, consequently, a case where a vergence of telephone occurs or, contrarily, a throughput of the data transmission deteriorates.

In the second embodiment, it is considered to provide means which can arbitrarily change the number of frequency channels which belong to each channel group.

Figure 13:
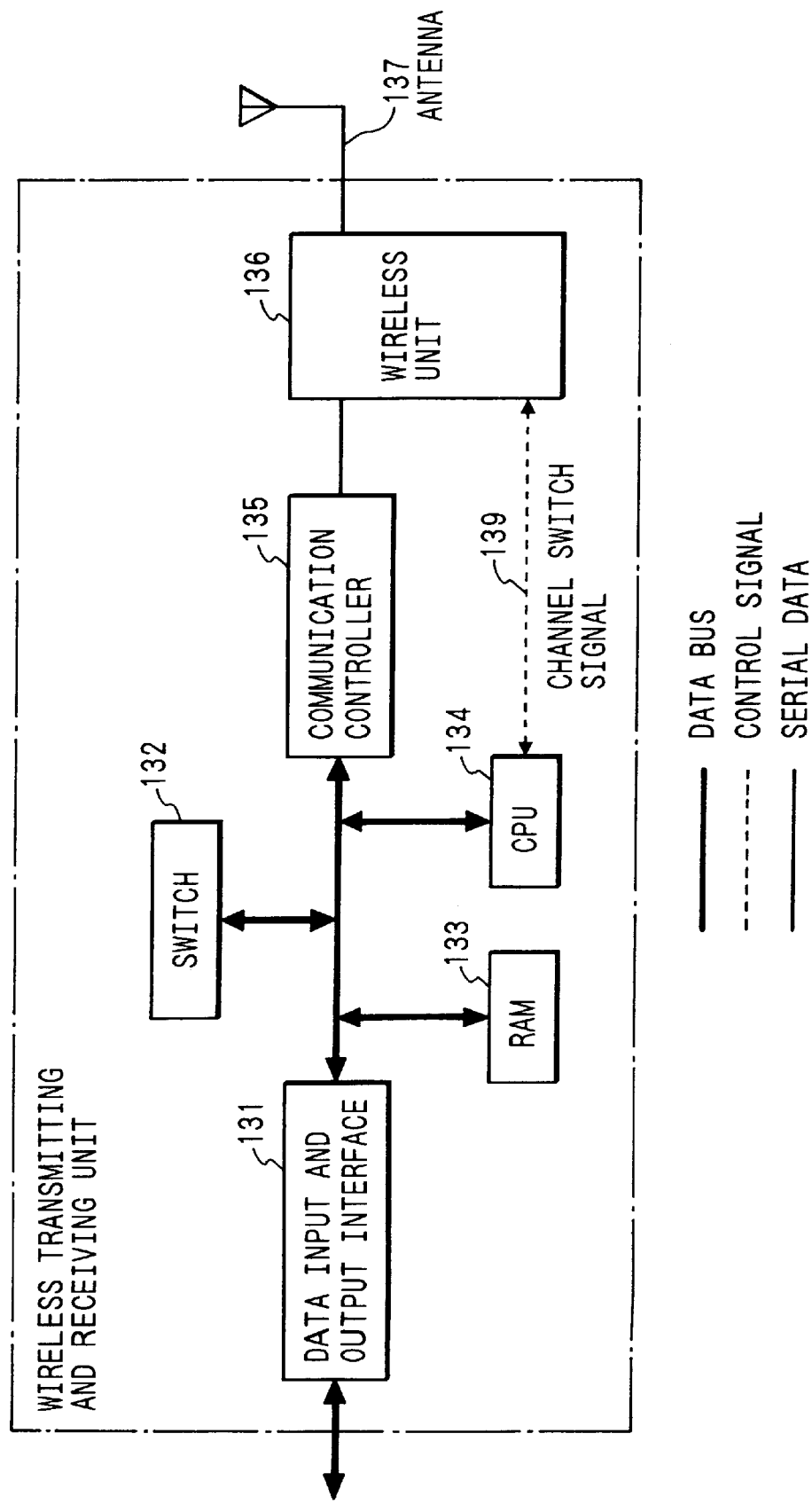
FIG. 13 is a block diagram showing a construction of a wireless interface in the second embodiment of the invention.

FIG. 13 is a block diagram showing a construction of a wireless interface in the second embodiment. It is assumed that a construction of the system is common to that in the above first embodiment (FIG. 1).

The wireless interface has: a data input and output interface (hereinafter, simply referred to as a data I/O interface) 131; a switch 132; a memory 133; a CPU 134; a communication controller 135; a wireless unit 136; and an antenna 137.

The data I/O interface 131 corresponds to the converting unit 20 in FIG. 3. The communication controller 135 corresponds to the ECC 21, frame assembling and disassembling unit 22, DPLL 23, transmission and reception control unit 24, frequency setting unit 25, and the like. The wireless unit 136 corresponds to the wireless unit 26. However, since the above component elements 131, 135, and 136 are not directly concerned with the characteristic portion of the embodiment, their detailed descriptions are omitted.

Figure 14:
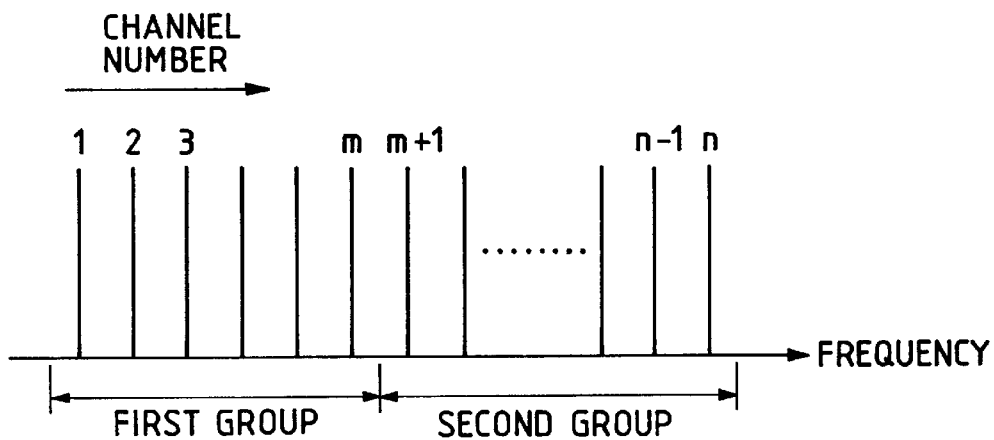
FIG. 14 is an explanatory diagram showing an example of a division of a frequency channel in the second embodiment.

FIG. 14 is an explanatory diagram showing an example of division of the frequency channel in the second embodiment.

In the embodiment, it is assumed that the frequency channel is divided into two groups, and in the first group, m channels of the channel numbers 1 to m are used and, in the second group, (n−m) channels of the channel numbers (m+1) to n are used. In the first channel group, a voice communication is performed through the main apparatus. In the second group, a peer-to-peer data communication is solely executed without intervening the central control unit such as a main apparatus or the like.

The number of channels in each group is set by the switch 132. The CPU 134 reads a value of the switch 132, stores the channel number to be used for each group into the memory (RAM) 133 on the basis of a combination of the channels used for each channel which has previously been formed and a correspondence table of the value of the switch 132, and decides a hopping pattern of each group on the basis of the channel number to be used and the number of channels to be used.

As mentioned above, the number of frequency channels which belong to each channel group can be properly changed.

The third embodiment of the invention will now be described.

In the above first and second embodiments, it is assumed as a prerequisite that the channels in each group are continuously arranged. However, in the case where a traffic amount of one group is small, only the other group is used. In this instance, it is desirable that the frequency intervals of the channels which are used are idle as much as possible. Namely, it is more effective to alternately arrange the channels of the first group and the channels of the second groups. With such a construction, a similar effect can be also obtained.

Figure 15:
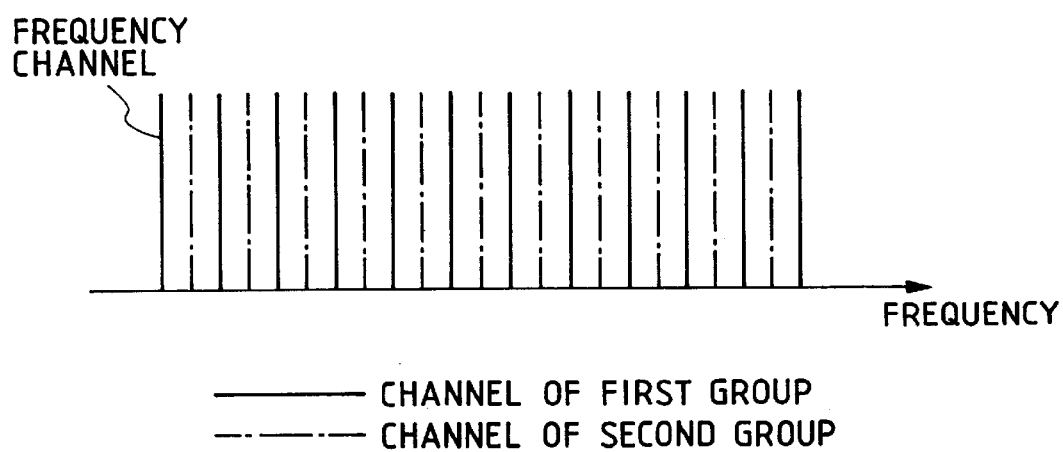
FIG. 15 is an explanatory diagram showing an example of a channel arrangement in the third embodiment of the invention.

FIG. 15 is an explanatory diagram showing an example of an arrangement of channels in the third embodiment. In the embodiment, as shown in FIG. 15, the frequencies of the first channel group and the frequencies of the second channel groups have alternately been arranged. The hopping pattern is decided with the frequency in each channel group. According to the embodiment, by alternately arranging the frequencies as shown in the diagram, there is an effect such that a mutual interference in the same group is difficult to occur.

Further, in the first embodiment, the telephone has been presumed as a terminal using the first channel group. However, so long as a terminal having a transmitting speed within a range of an exchanging ability of the main apparatus, a similar effect can be expected even in case of other media such as a facsimile and the like.

Although the embodiment has been described with respect to the example in which the frequency channels have been divided into only two channel groups, the channel group can be also divided into a larger number of channel groups and can be used.

In the above embodiments, although the channel group has been divided by the communication frame of the fixed length and the communication frame of the variable length, each of the divided channel groups can also use the communication frame of a variable length.

According to the embodiment as described above, the frequency channels are divided into a plurality of channel groups, the data of different types is transmitted every divided channel group, or the different channel access system is used every channel group, so that it is possible to prevent that the communication data collides or is mutually interfered. For example, the high-speed data transmission and the transmission of data having a strong real-time performance can be simultaneously communicated in the same system while preventing the data collision or mutual interference.

What is claimed is:

1. A wireless communication system having plural wireless communication apparatus for performing a communication by using plurality of frequency channels, comprising:

dividing means for dividing said plurality of frequency channels into a first channel group and a second channel group, said first channel group being used for communicating a fixed length communication frame and said second channel group being used for communicating a variable length communication frame;

discriminating means for discriminating whether data to be communicated is to be communicated in a fixed length communication frame or a variable length communication frame; and selecting means for selecting the channel group in accordance with the discrimination by said discriminating means.

2. A system according to claim 1, wherein said wireless communication apparatus communicates by using a frequency hopping method.

3. A system according to claim 1, wherein said discriminating means discriminates whether the communicated data is voice data or data other than the voice data.

4. A system according to claim 1, wherein said discriminating means discriminates whether the communicated data is data communicated through a public line or data communicated not through a public line.

5. A system according to claim 1, wherein the number of frequency channels in the channel group to be divided by said dividing means can be arbitrarily set.

6. A system according to claim 1, wherein said dividing means divides the frequency channels such that the frequency band of the first channel group and the frequency band of the second channel group overlap so that the frequency bands are alternately arranged.

7. A wireless communication apparatus for performing a communication by using a plurality of frequency channels, comprising:

dividing means for dividing said plurality of frequency channels into a first channel group and a second channel group, said first channel group being used for communicating a fixed length communication frame and said second channel group being used for communicating a variable length communication frame;

discriminating means for discriminating whether data to be communicated is to be communicated in a fixed length communication frame or a variable length communication frame; and selecting means for selecting the channel group in accordance with the discrimination by said discriminating means.

8. An apparatus according to claim 7, wherein said wireless communication apparatus communicates by using a frequency hopping method.

9. An apparatus according to claim 7, wherein said discriminating means discriminates whether the communicated data is voice data or data other than the voice data.

10. An apparatus according to claim 7, wherein said discriminating means discriminates whether the communicated data is data communicated through a public line or data communicated not through a public line.

11. An apparatus according to claim 7, wherein the number of frequency channels in the channel group to be divided by said dividing means can be arbitrarily set.

12. An apparatus according to claim 7, wherein said dividing means divides the frequency channels such that the frequency band of the first channel group and the frequency band of the second channel group overlap so that the frequency bands are alternately arranged.

13. A control method of a wireless communication apparatus for performing a communication by using a plurality of frequency channels, comprising the steps of:

dividing the plurality of frequency channels into a first channel group and a second channel group, said first channel group being used for communicating a fixed length communication frame and said second channel group being used for communicating a variable length communication frame;

discriminating whether data to be communicated is to be communicated in a fixed length communication frame or a variable length communication frame; and selecting the channel group in accordance with the discrimination in said discrimination step.

14. A method according to claim 13, wherein said wireless communication apparatus communicates by using a frequency hopping method.

15. A method according to claim 13, wherein said discriminating step discriminates whether the communicated data is voice data or data other than the voice data.

16. A method according to claim 13, wherein said discriminating step discriminates whether the communicated data is data communicated through a public line data communicated not through a public line.

17. A method according to claim 13, wherein the number of frequency channels in the channel group to be divided in said dividing step can be arbitrarily set.

18. A method according to claim 13, wherein, in said dividing step, the frequency channels are divided in a manner such that the frequency band of the first channel group and the frequency band of the second channel group overlap so that the frequency bands are alternately arranged.

19. A wireless communication system capable of performing a communication using fixed length and various length communication frames by using a plurality of frequency channels, comprising:

dividing means for dividing said frequency channels into a first channel group for communicating fixed length communication frames, and a second channel group for communicating various length communication frames;

discriminating means for discriminating whether data to be communicated is to be communicated in the fixed length communication frames or the variable length communication frames; and communication means for performing a communication by using either of the first channel group or the second channel group in accordance with the discrimination by said discriminating means.

20. A system according to claim 19, wherein the length of said communication frame is fixed when communicated data is voice data and is variable when communicated data is data other than the voice data.

21. A system according to claim 19, wherein the length of said communication frame is fixed when communicated data is data communicated through a public line, and is variable when communicated data is data communicated not through a public line.

22. A system according to claim 19, wherein the number of frequency channels in the channel group to be divided by said dividing means can be arbitrarily set.

23. A system according to claim 19, wherein said dividing means divides the frequency channels such that the frequency channels of the first channel group alternate with the frequency channels of the second channel group.

24. A system according to claim 19, wherein said wireless communication apparatus communicates by using a frequency hopping method.

25. A wireless communication apparatus capable of performing a communication using fixed length and variable length communication frames by using a plurality of frequency channels, comprising:

dividing means for dividing said frequency channels into a first channel group for communicating fixed length communication frames, and a second channel group for communicating variable length communication frames;

discriminating means for discriminating whether communication data to be communicated is to be communicated in the fixed length communication frames or the variable length communication frames; and communication means for performing a communication by using either of the first channel group or the second channel group in accordance with the discrimination by said discriminating means.

26. An apparatus according to claim 25, wherein the length of said communication frame is fixed when communicated data is voice data, and is variable when communicated data is data other than the voice data.

27. An apparatus according to claim 25, wherein the length of said communication frame is fixed when communicated data is data communicated through a public line, and is variable when communicated data is data communicated not through a public line.

28. An apparatus according to claim 25, wherein the number of frequency channels in the channel group to be divided by said dividing means can be arbitrarily set.

29. An apparatus according to claim 25, wherein said dividing means divides the frequency channels such that the frequency channels of the first channel group alternate with the frequency channels of the second channel group.

30. An apparatus according to claim 25, wherein said wireless communication apparatus communicates by using a frequency hopping method.

31. A control method of a wireless communication apparatus capable of performing a communication using fixed length and variable length communication frames by using a plurality of frequency channels, comprising:

a dividing step for dividing said frequency channels into a first channel group for communicating fixed length communication frames, and a second channel group for communicating variable length communication frames;

a discriminating step for discriminating whether communication data is to be communicated by the fixed length communication frames or by the variable length communication frames; and a communication step for performing a communication using the communication frames by said predetermined communication method by using either of the first channel group or the second channel group in accordance with the discrimination in said discriminating step.

32. A method according to claim 31, wherein the length of said communication frame is fixed when communicated data is voice data, and is variable when communicated data is data other than the voice data.

33. A method according to claim 31, wherein the length of said communication frame is fixed when communicated data is data communicated through a public line, and is variable when communicated data is data communicated not thorough a public line.

34. A method according to claim 31, wherein the number of frequency channels in the channel group to be divided in said dividing step can be arbitrarily set.

35. A method according to claim 31, wherein, in said dividing step, the frequency channels are divided in a manner such that the frequency channels of the first channel group alternate with the frequency channels of the second channel group.

36. An apparatus according to claim 31, wherein said wireless communication apparatus communicates by using a frequency hopping method.

37. A wireless communication system having plural wireless communication apparatuses and a wireless communication control apparatus for controlling said plural wireless communication apparatuses, comprising:

dividing means for dividing a plurality of frequency channels into a plurality of channel groups;

discrimination means for discriminating whether communication data is to be communicated through said wireless communication control apparatus, or communicated directly between said wireless communication apparatuses without going through said wireless communication control apparatus; and selecting means for selecting the channel group used for communication in accordance with the discrimination by said discriminating means.

38. A system according to claim 37, wherein said wireless communication apparatus and said wireless communication control apparatus communicate with each other using a frequency hopping system.

39. A system according to claim 37, wherein the communication data to be communicated through said wireless communication control apparatus is audio data, and the communication data to be communicated directly between said wireless communication apparatuses without through said wireless communication control apparatus is communication data other than audio data.

40. A system according to claim 37, wherein the communication data to be communicated through said wireless communication control apparatus is communicated using fixed length communication frames, and the communication data to be communicated directly between said wireless communication apparatuses without going through said wireless communication control apparatus is communicated using various length communication frames.

41. A system according to claim 37, wherein the number of frequency channels in the channel group to be divided by said dividing means can be set to an arbitrary number.

42. A system according to claim 37, wherein said dividing means divide the plurality of channel groups into a first channel group and a second channel group so that the frequency band of the first channel group and the frequency band of the second channel group overlap.

43. A wireless communication apparatus for a wireless communication system having plural wireless communication apparatuses and a wireless communication control apparatus for controlling said plural wireless communication apparatuses, comprising:

dividing means for dividing a plurality of frequency channels into a plurality of channel groups;

discrimination means for discriminating whether communication data is to be communicated through said wireless communication control apparatus, or communicated directly between said wireless communication apparatuses without going through said wireless communication control apparatus; and selecting means for selecting the channel group used for communication in accordance with the discrimination by said discriminating means.

44. An apparatus according to claim 43, wherein said wireless communication apparatus and said wireless communication control apparatus communicate with each other using a frequency hopping system.

45. An apparatus according to claim 43, wherein the communication data to be communicated through said wireless communication control apparatus is audio data, and the communication data to be communicated directly between said wireless communication apparatuses without through said wireless communication control apparatus is communication data other than audio data.

46. An apparatus according to claim 43, wherein the communication data to be communicated through said wireless communication control apparatus is communicated using fixed length communication frames, and the communication data to be communicated directly between said wireless communication apparatuses without going through said wireless communication control apparatus is communicated using various length communication frames.

47. An apparatus according to claim 43, wherein the number of frequency channels in the channel group to be divided by said dividing means can be set to an arbitrary number.

48. An apparatus according to claim 43, wherein said dividing means divides the plurality of channel groups into a first channel group and a second channel group so that the frequency band of the first channel group and the frequency band of the second channel group overlap.

49. A method of controlling a wireless communication system having plural wireless communication apparatuses and a wireless communication control apparatus for controlling the plural wireless communication apparatuses, comprising:

a dividing step of dividing a plurality of frequency channels into a plurality of channel groups;

a discrimination step of discriminating whether communication data is to be communicated through the wireless communication control apparatus, or to be communicated directly between the wireless communication apparatuses without going through the wireless communication control apparatus; and a selecting step of selecting the channel group used for communication in accordance with the discrimination in said discrimination step.

50. A method of controlling a wireless communication apparatus for a wireless communication system having plural wireless communication apparatuses and a wireless communication control apparatus for controlling the plural wireless communication apparatuses, comprising:

a dividing step of dividing a plurality of frequency channels into a plurality of channel groups;

a discrimination step of discriminating whether communication data is to be communicated through the wireless communication control apparatus, or to be communicated directly between the wireless communication apparatuses without going through the wireless communication control apparatus;

a selecting step of selecting the channel group used for communication in accordance with the discrimination by said discriminating step.

* * * * *

UNITED STATES PATENT AND TRADEMARK OFFICE
CERTIFICATE OF CORRECTION

PATENT NO. : 6,130,885
DATED      : October 10, 2000
INVENTOR(S): MICHIHIRO IZUMI, ET AL.

It is certified that error appears in the above-identified patent and that said Letters Patent is hereby corrected as shown below:

<u>COLUMN 12</u>:
Line 55, "thorough" should read --through--.

Signed and Sealed this

Fifteenth Day of May, 2001

Attest:

NICHOLAS P. GODICI

*Attesting Officer*     *Acting Director of the United States Patent and Trademark Office*